United States Patent [19]

Matsuura

[11] 3,729,571

[45] Apr. 24, 1973

[54] INSULATION FOR POWER CABLE JOINTS AND A METHOD OF MAKING SAME

[75] Inventor: Kenji Matsuura, Ikeda, Japan

[73] Assignee: Sumitomo Electric Industries, Ltd., Osaka, Japan

[22] Filed: May 14, 1970

[21] Appl. No.: 48,731

Related U.S. Application Data

[62] Division of Ser. No. 815,432, April 11, 1969, Pat. No. 3,596,572.

[30] Foreign Application Priority Data

Apr. 12, 1968 Japan ..............................43/24027
Aug. 27, 1968 Japan ..............................43/73355

[52] U.S. Cl.............174/25 R, 138/140, 174/110 P, 174/120 FP
[51] Int. Cl..............................................H01b 7/02
[58] Field of Search ................174/25 R, 124 R, 174/122 R, 120 FP, 110 P, 84 R; 93/94; 138/140, 149, 151

[56] References Cited

UNITED STATES PATENTS

| 2,831,050 | 4/1958 | Mulligan | 174/122 R |
| 2,402,451 | 6/1946 | Scott et al. | 174/84 R |
| 1,771,216 | 7/1930 | Gossler | 174/124 R |

Primary Examiner—Bernard A. Gilheany
Assistant Examiner—A. T. Grimley
Attorney—Richard C. Sughrue et al.

[57] ABSTRACT

An insulation for power cable joints wherein a previously shaped split-type paper cylinder is placed over the cable core such that the outside edge thereof forms a snail-like borderline.

3 Claims, 10 Drawing Figures

Patented April 24, 1973 3,729,571

Patented April 24, 1973 3,729,571

INSULATION FOR POWER CABLE JOINTS AND A METHOD OF MAKING SAME

This application is a division of Ser. No. 815,432 filed 4-11-69 and now U.S. Pat. No. 3,596,572.

This invention relates to insulation used at the joints of power cables of the SL type, OF type, POF type, etc. It has been the practice heretofore to manually wrap the joints of power cables of the aforementioned types with oil-impregnated paper, sheet by sheet or tape by tape. This method has serious drawbacks in that constructing such insulation in the field takes considerable time and that during this period moisture is readily absorbed by the insulation due to the surroundings in which such construction takes place, for example, in manholes, etc.

The object of the present invention is to eliminate these drawbacks and to obtain an insulation which materially reduces the time required for the operation of joining power cables and which prevents the absorption of moisture and thereby materially increases the dielectric strength of the insulation. This invention is characterized in that one layer or a plurality of layers of previously formed paper cylinders of the split-type are placed over the cable cores.

DETAILED DESCRIPTION OF THE INVENTION

Figure 1:
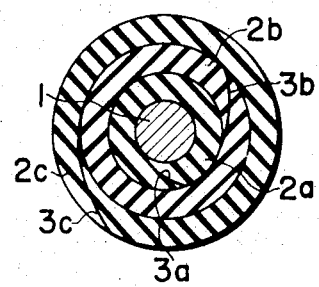
FIG. 1 is a cross sectional view of an example of the insulation of the present invention.
Figure 2:
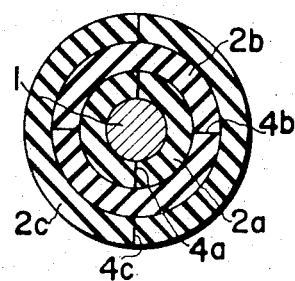
FIG. 2 is an imaginary cross sectional view for the purpose of comparison with the insulation of the present invention.

The invention will now be explained with reference to the examples shown in the drawings. In FIG. 1, the cable core 1 has insulation 2a of this invention wound over the cable core 1 to form a split borderline 3a as will be described later. FIG. 1 shows three layers of insulation 2a, 2b, and 2c. Layer 2a is wound adjacent the cable core 1 and has a split borderline 3a. A second layer 2d is wound adjacent layer 2a and has a split borderline 3b. A third layer 2c is wound around layer 2b and has a split borderline 3c. The snail-like split borderline, for example 3a, is formed by winding the insulation 2a over the cable core 1 and also over the insulation itself in a manner which will now be explained. Suppose that, for example, cylindrical insulation, such as that shown at 2a in FIG. 2, is made of paper and is placed over the cable core 1 and a split borderline 4a is cut in a radial direction with a knife and wherein a second layer of insulation 2b and a third layer of insulation 2c are provided over insulation layer 2a and similar borderlines 4b and 4c are cut in radial directions in the insulations 2b and 2c, respectively. Now consider the direction of field vector at the borderlines 4a, 4b and 4c when a voltage is applied. Since the direction of the field vector almost coincides with the direction of the borderline, the dielectric strength at the borderlines 4a, 4b, 4c becomes minimal and insulation breakdown is most likely to occur at these points.

Figure 3:
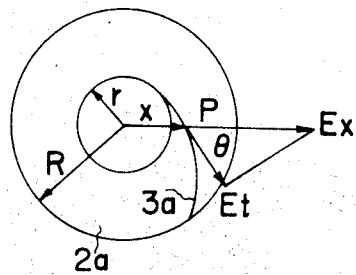
FIG. 3 is a diagram of the field vector on the borderlines of the insulation of the present invention.

According to the present invention, however, the borderlines 3a, 3b, 3c are not in the radial direction but in fact make snail-like curves as shown in FIG. 1 so that the dielectric strength at the borderline parts is made considerably greater. This will be explained with reference to FIG. 3. Field vector $E_t$ in the tangential direction at point P (distance from the center represented by X) on the split borderline 3a formed in the insulation 2a of the cable joint having an inner radius r and an outside radius R is:

$$E_t = V \cos \theta / X ln (R/r)$$

Vector $E_x$ in the radial direction is:

$$E_x = V/X ln (R/r)$$

where $V$ is the voltage applied across the insulator. Hence, $E_t$ is $E_x$ multiplied by $\cos \theta$. Since $\cos \theta$ is less than 1, it is possible to enhance the breakdown voltage at point P considerably. It is also possible to make $\theta = 90°$ at a point on the inside electrode ($X = r$) where field intensity in the radial direction is the greatest, so that the component of field vector parallel to the split borderline is zero.

Figure 4:
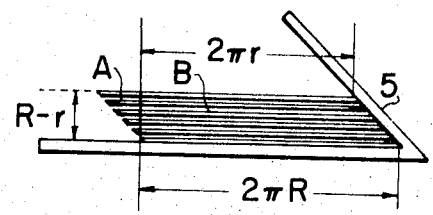
FIG. 4 shows the frame for preparing the insulation according to the present invention.

The method of making the insulation 2a which has the aforementioned split borderline 3a will be explained. First, a frame 5 having a gradient of $1/2\pi$ as shown in FIG. 4 is prepared. Paper cut into sheets of the same size having a length of $2\pi R$ is put into the frame, the sheets are then placed on top of each other until the thickness becomes Rr. The ear part A at the left end is then cut off. A laminated body B having a top length of $2\pi r$ and a bottom length of $2\pi R$ is obtained in this manner.

Figure 5:
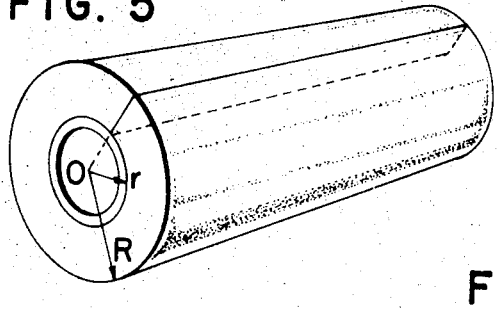
FIG. 5 shows another example of the method of producing the insulating joint for the power cable of the present invention.
Figure 6:
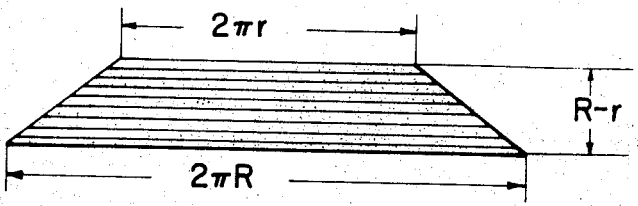
FIG. 6 shows the resultant paper layers cut along the radial direction as shown in FIG. 5.
Figure 7:
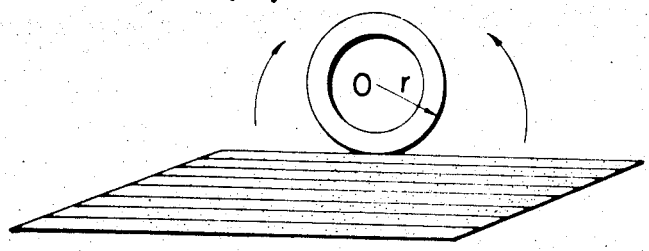
FIG. 7 shows the laminated paper layers of FIG. 6 in the shifted form.

Another method of producing an insulating joint for a power cable wherein each of the cylindrical insulating layers have snail-like cross sectional mating line will now be described with reference to FIGS. 5, 6 and 7. Here, a sheet of insulating paper is continuously wound on a pipe having a radius of r until the external radius of the insulating layer becomes R. Then, the resultant paper layer is cut in the radial thickness direction as shown in FIG. 5 and unfolded to obtain laminated paper sheets having a trapezoidal cross section as shown in FIG. 6. The length of the upper side, bottom side and height of the trapezoid are $2\pi r$, $2\pi R$ and Rr, respectively. Each paper sheet is then shifted to form the laminated paper sheets having a cross section as shown in FIG. 7, and successively wound on a cylinder which has an outer radius of r to obtain a cylindrical insulator having the snail-like cross sectional mating line that is shown at 2a and 3a of FIG. 3. The insulation, after having been shaped in this manner, is treated by drying, oil-impregnation and the like and is then used for reinforcing insulation for power cable joints.

Previously, it took no less than 5 hours to apply reinforcing insulation to a 275 KV oil-filled cable joint. By using the reinforcing insulation of the present invention, the application of such insulation now only requires about 30 minutes. The actual joining operation has also been greatly simplified. The dielectric strength is also greatly improved because the borderline is not in a radial direction. Further, because the lapping of the sheets of paper is not done individually, as in the past, the present operation prevents the insulation from absorbing moisture even when the operation is carried out in a wet man-hole. In addition, because the area of the snail-like overlap portion is larger, the mechanical strength of the final insulation is greater.

Figure 8:
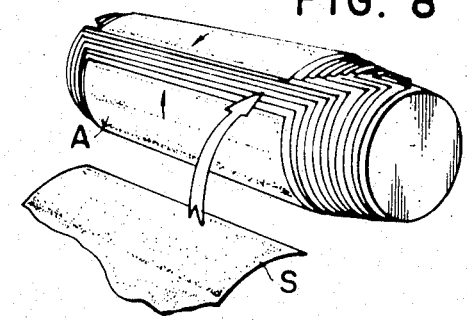
FIG. 8 shows another example of an insulated joint formed by the method of the present invention.

In another example of the present invention, one or more sheets of oil impregnated paper or plastic film(s) are inserted into a mating face formed by both ends of each cylindrical insulator layer and are wound on the peripheral surfaces of the cable core. The cylindrical insulator layers, as shown in FIG. 8, make the winding of the insulating layer cylindrically on the cable core surface and underlying insulator cylinder easy.

Figure 9A:
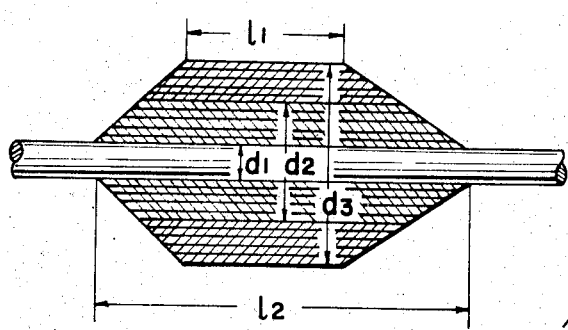
FIGS. 9a and 9b show cross sectional views of the joint of insulation shown in FIG. 8.
Figure 9B:
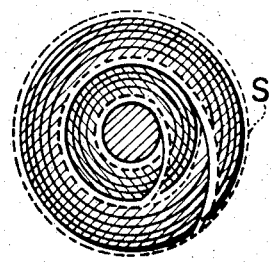

FIG. 9a shows a cross sectional view of the joint of insulator layer wound on power cable along the cable's length, and FIG. 9b shows a cross sectional view of the same joint taken perpendicular to cable's length.

In FIG. 9b, the dotted line(s) shows a sheet of oil impregnated paper or plastic film wound on the cable core surface and the insulator layer surface and also inserted into a mating face between both ends of the cylindrical insulator layer. This makes the winding or wrapping of the insulating layer easy and also acts to compact the joint assembly which is composed of the cable core and the insulating layers.

In an insulated joint of the 70KV, 600 mm² single core OF type cable having diameters $d_1 = 49.3$ mm, $d_2 = 70$ mm, $d_3 = 90$ mm, and length of $l_1 = 280$ mm and $l_2 = 720$ mm, and an oil impregnated paper of a thickness of 0.125 mm, the results of a sustained alternating current application break down test and impulse breakdown test were 225 KV and 580 KV, respectively. The voltages which resulted from the aforementioned breakdown test are comparable to or superior to those which are obtained by the conventional "tape-on-tape" winding method for forming an insulated joint.

The rewinding of an unfolded insulating layer is easily accomplished because of the existence of the oil impregnated paper or plastic film placed between the insulating layers or between the insulating layer and the cable core. This also results in an increase in the packing or tightening force of the insulating layers. Further, the cable core and insulating layers adhere to each other well which results in a compact joint assembly which has an increased breakdown strength. This insulating assembly is especially well suited for joints in OF type cables or POF type cables which have applied voltages of between 70 and 500 KV.

What is claimed is:

1. A cylindrical insulation sleeve for use in insulating a cylindrical conductive core of a power cable, said sleeve comprising: a pre-shaped, multi-layer paper cylinder having a slit running the length of the same and transverse to the ends of same permitting said cylinder to be positioned about said cable core, said paper cylinder characterized by having opposed longitudinal edges of each layer of said paper cylinder abutting each other after positioning on said core with the abutment line of successive layers being circumferentially offset slightly in a radially progressive manner to create at the annular ends of the same, a snail-like borderline.

2. An insulated power cable comprising: a cylindrical conductive core, a multi-layer pre-shaped paper cylinder encircling said core and having a slit running down the length thereof and transverse to the ends of said paper cylinder with the opposed longitudinal edges of each layer of said paper cylinder abutting each other and having the abutment line of said layers circumferentially offset slightly from each other progressively in a radial manner to create at the annular edges thereof a snail-like borderline.

3. In an insulating assembly comprising:
   a. at least one cylindrical insulating layer wound on a cable core, said layer having a snail-like cross sectional mating line, and
   b. at least one sheet of oil impregnated paper positioned between the mating faces of each insulating layer and wound on the peripheral surfaces of said cable core and said cylindrical insulating layer.

* * * * *